A. DE VILBISS, Jr.
WEIGHING SCALE.
APPLICATION FILED MAY 15, 1906.

1,053,582.

Patented Feb. 18, 1913.

2 SHEETS—SHEET 1.

A. DE VILBISS, Jr.
WEIGHING SCALE.
APPLICATION FILED MAY 15, 1906.

1,053,582.

Patented Feb. 18, 1913.

2 SHEETS—SHEET 2.

UNITED STATES PATENT OFFICE.

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

WEIGHING-SCALE.

1,053,582.

Specification of Letters Patent.   Patented Feb. 18, 1913.

Application filed May 15, 1906.   Serial No. 316,949.

*To all whom it may concern:*

Be it known that I, ALLEN DE VILBISS, Jr., residing at Toledo, in the county of Lucas and State of Ohio, have invented certain new and useful Improvements in Weighing-Scales, of which the following is a specification.

The object of the present invention is to provide ready means for ascertaining net weight of commodities, such for example, as the contents of receptacles in cases where the weight of the receptacle is to be deducted from the gross weight.

It is customary in putting up various commodities, such for example as biscuit, to employ receptacles such as tin boxes or cans with glass fronts, the receptacles being marked to show their weight when empty. To ascertain the exact weight of the contents of the receptacle it is of course necessary to deduct from the total weight of receptacle and contents the tare weight represented by the marking on the receptacle. The present invention provides ready means for ascertaining the net weight in such cases.

With the above stated object in view, the invention consists in certain novel features of construction and combinations of parts the essential elements whereof are recited in the appended claim and a preferred form of embodiment of which is described in detail hereinafter and fully illustrated in the accompanying drawings forming part of the specification.

Figure 1:
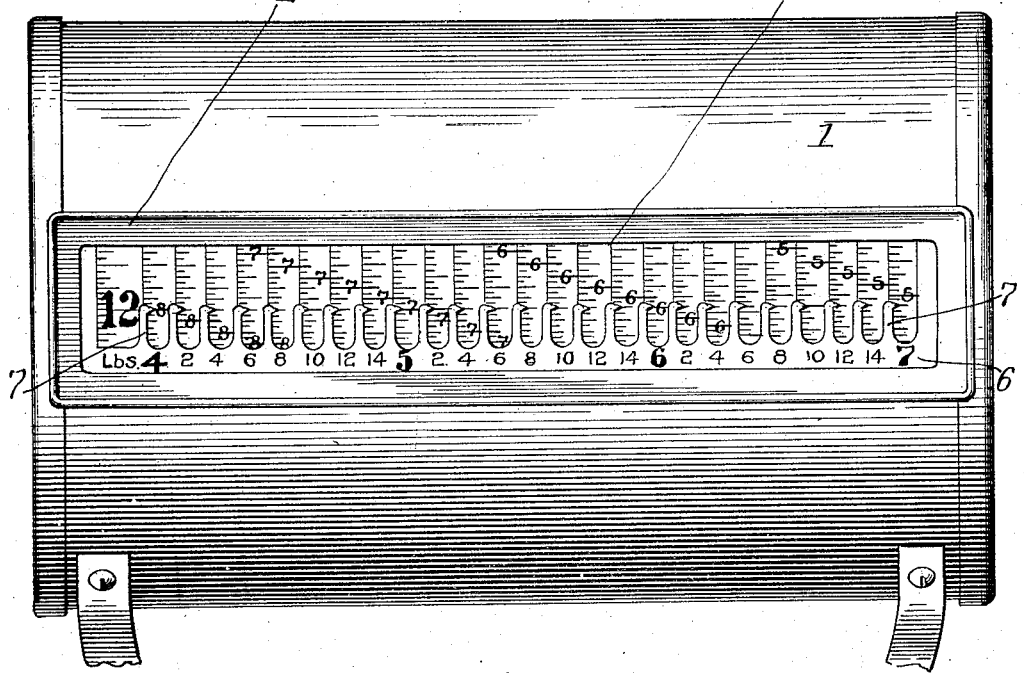
Figure 2:
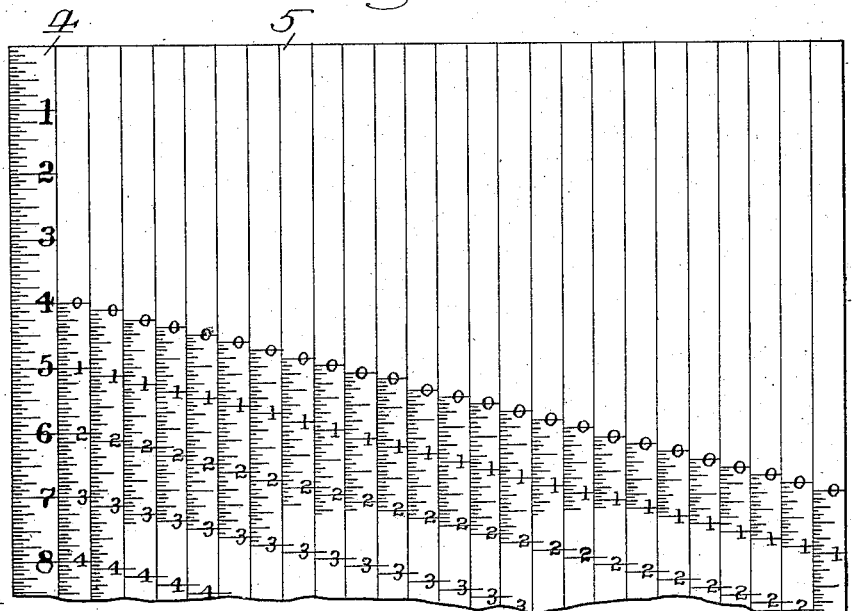
Figure 3:
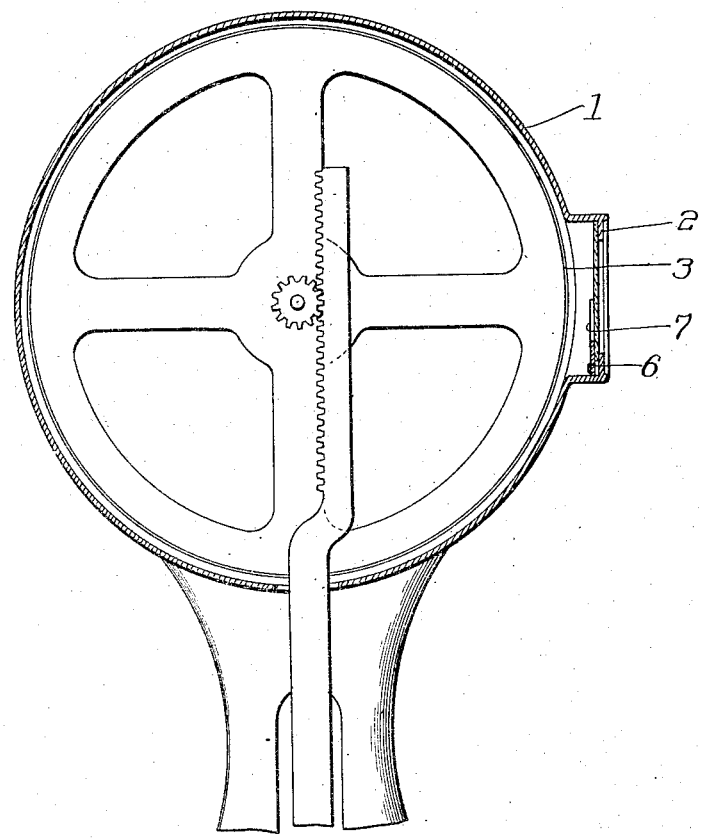

Of said drawings Figure 1 represents in front elevation that portion of a familiar type of weighing scales with which the present invention is combined; Fig. 2 represents a portion of the scale chart developed;
and Fig. 3 represents in vertical cross section the portion of the scales shown in Fig. 1.

The type of weighing scales which has been chosen for purposes of illustration in the present case is that of the spring balance variety employing a rotary cylinder or drum.

In the drawings the reference numeral 1 designates the cylindrical casing for the drum and 2 designates the inclosed drum which is suitably mounted to rotate in said casing in a well known manner, being appropriately connected with the platform of the scales. The casing 1 is formed with a sight opening 3 of generally rectangular contour, extending horizontally across the front of the casing and a section of the drum shows through this sight opening. The inclosed cylinder or drum carries a chart made up of a number of circumferential rows of graduations or scales. The one designated 4 and encircling the cylinder or drum at its left-hand end as the parts appear in Fig. 1, is marked to denote the gross weight of any load upon the scale platform. This gross weight will be read from said scale 4 through the sight opening at the left-hand end thereof at the vertical center. The balance of the circumferential rows of graduations 5 are made up of markings to denote the net weight, as for example, the weight of the contents of a receptacle whose own weight is to be deducted. As the invention is illustrated in the present instance the first net weight scale to the right of the gross weight scale commences coincidently with the four-pound mark on the latter scale. The next net weight scale to the right commences coincidently with the mark on the gross weight scale denoting four pounds and two ounces. The balance of the net weight scales are graded as to their zero points accordingly.

On the lower side of the sight opening 3 there is secured to the casing 1 a tare weight scale comprising a strip or plate 6 extending the length of the opening and a series of index fingers or pointers 7 spaced apart in correspondence with the spacing of the net weight scales on the inclosed cylinder. In the present instance the tare weight scale is shown as running from four to seven pounds with intervening ounce numerals increasing by two units from one pound numeral to the next. These numerals on the tare weight scale correspond in location with the net weight scales of the inclosed cylinder so that there will be a tare weight numeral in line with each of said net weight scales. The fingers or pointers 7 project over the sight opening 3 at points between the numerals of the tare weight scale and have laterally projecting points at their ends overlying the said net weight scales respectively.

In the use of weighing scales equipped with the present invention a filled receptacle will be placed upon the platform and the tare weight marked thereon consulted and then the net weight ascertained by reading the particular net weight scale of the cylinder which coincides with the numerals of the tare weight scale 6 corresponding with those on the receptacle. The illustration in Fig. 1 of the drawings represents a condition in which the receptacle and contents have a gross weight of twelve pounds. If for example, the receptacle is marked with a tare weight of four pounds then the net weight is ascertained by reading the scale immediately adjacent to the gross weight scale. In this instance the pointer 7 indicating the numeral 8 on said net weight scale shows a net weight of eight pounds. If the tare weight marked on the receptacle should be four pounds, two ounces, then the next net weight scale to the right would be used, the pointer 7 belonging to this scale indicating seven pounds and fourteen ounces, and so on throughout the series of numerals of the tare weight scale 6.

It will now be seen that the construction herein shown and described is well calculated to fulfil the object primarily stated. However, it is to be understood that the invention may be carried out in other ways, its uses not being confined to the particular type of weighing scales here chosen for purposes of illustration.

What is claimed is:

In a weighing scale, net weight computing means consisting of a casing having a horizontal sight opening, a cylindrical chart mounted for rotation within the casing and past the sight opening, a tare table arranged along one horizontal edge of the sight opening, a series of pointers in horizontal alinement one for coöperation with each weight indication on the tare table, a circumferential gross weight table upon the chart, a series of circumferential net weight tables severally arranged opposite the respective weight indications upon the stationary tare table each indication in the same horizontal line with a gross weight indicating the net weight corresponding to the gross weight and the tare in alinement therewith on the stationary tare table.

ALLEN DE VILBISS, Jr.

Witnesses:
F. P. DAVIS,
LOUIS B. ERWIN.